United States Patent
Feigel et al.

(10) Patent No.: US 6,268,784 B1
(45) Date of Patent: Jul. 31, 2001

(54) MAGNETIC VALVE

(75) Inventors: Hans-Jörg Feigel, Rosbach; Manfred Rüffer, Sulzbach; Michael Germuth-Löffler, Kleinwallstadt; Wolfgang Schieblich, Weiterstadt, all of (DE)

(73) Assignee: Continental Teves AG & Co., oHG, Frankfurt (DE)

(*) Notice: Subject to any disclaimer, the term of this patent is extended or adjusted under 35 U.S.C. 154(b) by 0 days.

(21) Appl. No.: 09/341,628
(22) PCT Filed: Dec. 22, 1997
(86) PCT No.: PCT/EP97/07239
  § 371 Date: Oct. 20, 1999
  § 102(e) Date: Oct. 20, 1999
(87) PCT Pub. No.: WO98/31577
  PCT Pub. Date: Jul. 23, 1998

(30) Foreign Application Priority Data

Jan. 14, 1997 (DE) .............................. 197 00 979

(51) Int. Cl.$^7$ ....................................... H01F 3/00
(52) U.S. Cl. .................. 335/261; 335/278; 251/129.15
(58) Field of Search .................. 333/256, 251-9, 333/276, 261; 251/129.15–129.2

(56) References Cited

U.S. PATENT DOCUMENTS

| 5,197,709 | * | 3/1993 | Kroll et al. ..................... 251/129.15 |
| 5,462,142 | * | 10/1995 | Handke et al. ........................ 403/202 |
| 5,496,100 | * | 3/1996 | Schmid ............................ 251/129.19 |
| 5,636,828 | * | 6/1997 | Brehm et al. .................... 251/129.16 |

FOREIGN PATENT DOCUMENTS

| 309 663 | 11/1955 | (CH) . |
| 22 08 183 | 9/1973 | (DE) . |
| 22 36 586 | 2/1974 | (DE) . |
| 23 37 422 | 2/1974 | (DE) . |
| 36 34 349 | 5/1987 | (DE) . |
| 85 22 724 | 3/1989 | (DE) . |
| 40 03 606 | 12/1990 | (DE) . |
| 40 39 324 | 6/1992 | (DE) . |
| 41 33 536 | 4/1993 | (DE) . |
| 42 01 449 | 7/1993 | (DE) . |
| 44 26 110 | 1/1996 | (DE) . |
| 44 46 860 | 7/1996 | (DE) . |
| 94 01 708 | 1/1994 | (WO) . |

OTHER PUBLICATIONS

Search Report of the German Patent Office for Application No. 197 00 979 Jul. 1988.

* cited by examiner

Primary Examiner—Lincoln Donovan
(74) Attorney, Agent, or Firm—Rader, Fishman & Grauer PLLC

(57) ABSTRACT

The present invention discloses a magnetic valve for liquid and gaseous working media, in particular for hydraulic brake systems in automotive vehicles, which includes a first cylindrical housing part that is encompassed on its outside by a magnetic coil and has a cylindrical recess inside which extends in an axial direction to accommodate and guide an axmature, a tappet which is displaceable by the armature in an axial direction in opposition to a resetting spring, a second cylindrical housing part which is arranged coaxially to the first housing part and includes a cylindrical recess extending in an axial direction, the said recess being in connection to outside valve ports and in which a valve seat cooperating with the tappet is arranged. According to the present invention, the first and second housing parts form a housing which is made in one piece of a ferromagnetic material and encompasses the armature over at least part of its longitudinal extension in the shape of a sleeve whose walls are sufficiently thick to reduce the magnetic short-circuit but are not thicker than required to reliably accommodate mechanical stresses.

9 Claims, 7 Drawing Sheets

MAGNETIC VALVE

TECHNICAL FIELD

The present invention relates to a magnetic valve for liquid and gaseous working media, in particular for hydraulic brake systems in automotive vehicles.

BACKGROUND OF THE INVENTION

WO 94/01708 discloses a magnetic valve of this type. According to the embodiment shown, the said valve comprises a top housing part in the form of a thin-walled sleeve closed on its end and a bottom housing part with valve seat and passages for the inflow and outflow of a working medium. The bottom housing part is sealingly pressed into a valve accommodation, and the top housing part is encompassed by a magnetic coil. For connecting the two housing parts, a magnetic core is used which is fitted with its bottom cylindrical area into the bottom housing part and with its top cylindrical area of smaller diameter is fitted into the top housing part. The transition area has a conical design. The top housing part with its conically enlarged bottom end abuts on the transition area. The magnetic core and the top housing part are fastened above the transition area in the bottom housing part by displacement of plastic material. A tappet is guided in the magnetic core which cooperates with the valve seat and is connected to a longitudinally slidable armature that is arranged above the magnetic core in the top housing part. The armature is urged against the stop formed by the upper end of the top housing part by way of a resetting spring which is supported in the magnetic core and acts in the opening direction of the valve. When the magnetic coil is energized, a magnetic field develops and causes the armature to urge the tappet against the valve seat in overcoming the resistance of the resetting spring. Thus, the prior art magnetic valve is illustrated as a normally open valve, called NO valve in short.

The top housing part in this valve is made of a non-ferromagnetic material in order to prevent a magnetic short-circuit and permit operation of the valve with small losses only. This aspect is of special significance when, as is the case in anti-lock systems (ABS) or traction slip control systems (TCS) in automotive vehicles, there is the requirement of high closing pressures, on the one hand, and small overall dimensions, on the other hand. It is a general objective in these and other cases of application to minimize the magnetic losses to the greatest possible extent in order to achieve a compromise between contrasting requirements which is also reasonable under economical aspects.

Because the armature must be movable axially for functional reasons, a radial air gap is exactly as necessary as an axial residual air gap between the magnetic core and the armature in order to avoid a sticking connection. Also, the wall thickness of the top housing part which is not ferromagnetic must be considered as a loss-involving 'air gap'. More specifically, the magnetic losses which are produced by the sum of the air gaps in the prior art magnetic valve adopt a value which cannot be reduced any further, not even if highly narrow manufacturing tolerances are complied with.

The prior art magnetic valve suffers from the additional shortcoming that its adjustability is very intricate. During the assembly, a thin washer which corresponds to the residual air gap desired is interposed between the armature and the magnetic core. Thereafter, the top housing part with its contents is inserted into the bottom housing part until the magnetic core bears against the bottom housing part in an axial direction. The tappet which is initially inserted into the armature only in a light press fit and is supported on the valve seat is displaced upwardly relative to the armature. Subsequently, the parts are dismantled again, and the tappet is fixed in position in the armature by caulking.

In the second adjustment step, a washer which corresponds to the desired air gap in the deenergized condition, hence, which corresponds to the residual air gap plus working stroke desired is inserted between the armature and the magnetic core. All parts are assembled again, and the top housing part is urged into the bottom housing part until the magnetic core bears against the stop. In this arrangement, the armature is shortened plastically in its top weakened area by the size desired. Thereafter, the assembly must be dismantled and the washer removed before the parts can be reassembled and, as described hereinabove, coupled to each other in a third step.

The generic German utility model application No. 8522724.2 discloses a magnetic valve which includes a first cylindrical housing part, made of a ferromagnetic material, to form the magnetic core, and a second sleeve-type housing part, made of a ferromagnetic material, to accommodate a magnetic armature and a valve seat member which has a plurality of pressure fluid ports that are separated hydraulically by a tappet fitted to the magnetic armature in the initial position of the valve. Another housing portion which is made of a non-magnetic material is provided between the two housing parts. The above-mentioned separate housing parts are joined in the area of the non-magnetic material.

An object of the present invention is to improve upon a magnetic valve of the type mentioned hereinabove so that the magnetic losses in the working range of the valve can be reduced further, on the one hand, and that the valve adjustment can be simplified, on the other hand.

Surprisingly, it has shown that the losses due to magnetic short-circuits are reduced when conventional ferromagnetic automatic steel is used compared to a magnetic valve of the prior art type which is comparable in its overall size. This is due to the fact that, on the one hand, at least the losses caused by the radial air gap can be reduced and, on the other hand, magnetic saturation occurs very quickly in the area of the sleeve due to the small wall thickness. Even at operating pressures of 200 to 350 bar and in consideration of usual safety margins, the load-bearing sleeve cross-section can be reduced so that the short-circuit losses in the one-part housing are lower than in the prior art two-part housing with a top sleeve-type part made of a non-ferromagnetic material. Besides, material selection and a specific heat treatment offer further possibilities to shift the necessary compromise in designing the sleeve cross-section so that the magnetic short-circuit losses are further reduced.

Another advantage of the one-part housing design is that it obviates the need for adapting and joining steps and that it reduces the number of manufacturing tolerances to be considered. This becomes apparent especially in the adjustment of the magnetic valve, wherein due to the large number of parts cooperating in magnetic valves for an operating pressure of e.g. 200 to 220 bar, the operating pressure may vary between 200 and 350 bar without adjustment.

DETAILED DESCRIPTION OF THE PREFERRED EMBODIMENTS

Figure 1:
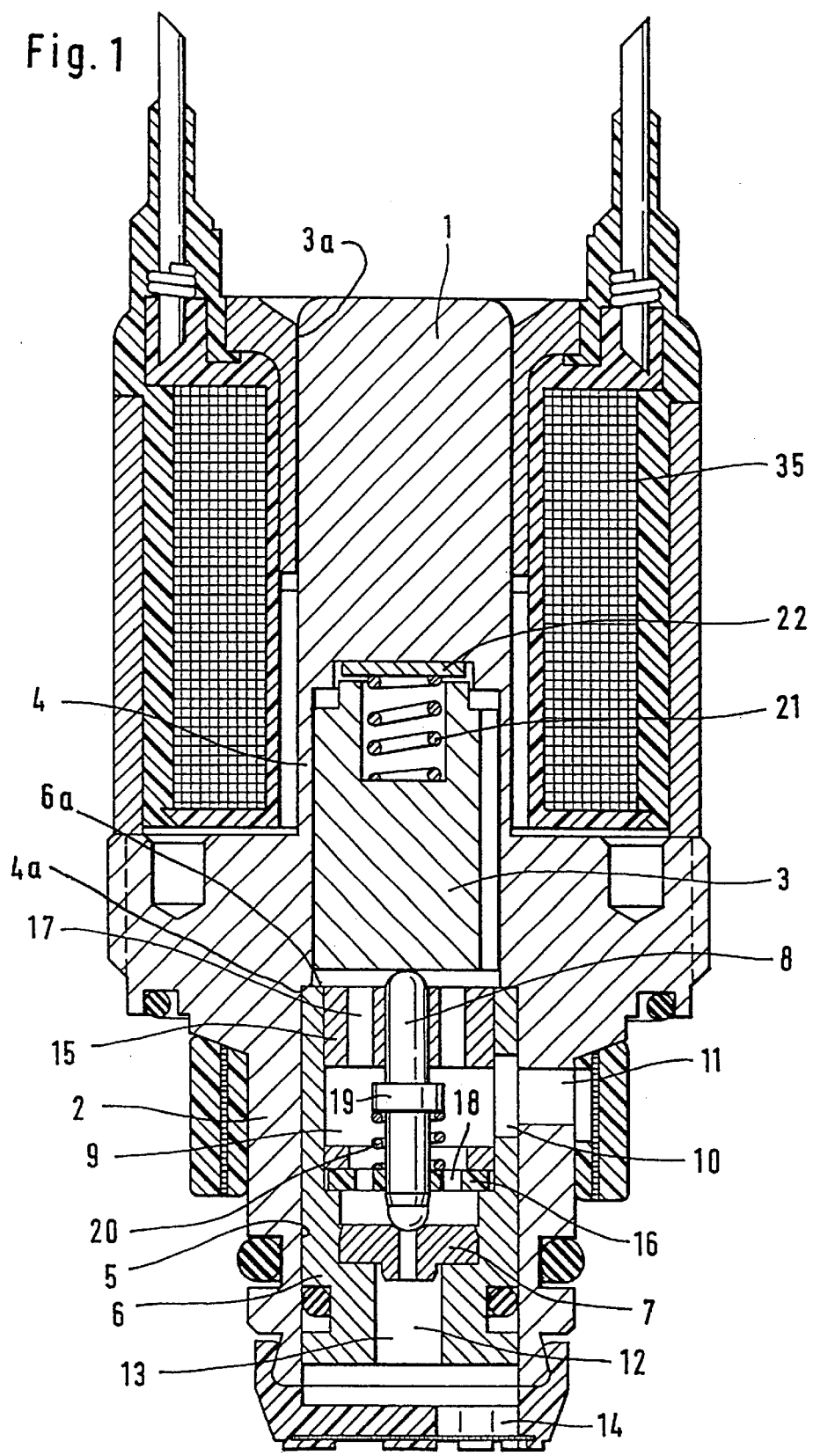
FIG. 1 is a vertical cross-sectional view of a first embodiment of a magnetic valve of the present invention.

In the embodiment of FIG. 1, the top housing part 1 of the one-part housing is made of a solid cylindrical portion 6 which is encompassed by a magnetic coil 35, and a downwardly following sleeve 4 which is connected integrally with the bottom housing part 2 configured as a screw-type coupling part. The sleeve 4 defines an interior bore 3a. The bore 3a and the top area of the top housing part 1 are used to axially guide the armature 3 which is supported, on the one hand, on a resetting spring 21 that acts in the closing direction and an anti-stick washer 22 in the solid cylindrical portion and, on the other hand, on the tappet 8 which in turn bears against the valve seat 7. The bottom housing part 2 has a central bore 5 which is slightly larger than the armature bore 3a, and the step in diameter created by the interface of the two bores provides an annular housing stop 4a which can be used as plane of reference, as will be explained hereinbelow. A tubular support member 6 is inserted into the bore 5 which, beside the valve seat 7, includes an insert 15 and a washer 16 which are used to guide the tappet 8. The insert 15 and the washer 16 are both formed in the nature of annular metal washers, each having axial passages 17 and 18, respectively, extending through their annular bodies. Ideally, in the embodiments of FIGS. 1–3, the thickness of the insert 15 will be greater than that of the washer 16. The insert 15 is pressed into the support member 6 and welded at its edge, if necessary, and the washer 16 is retained in the support member 6 by way of a caulked ring (not referred to). The interior of the support member 6 is subdivided by the valve seat 7 into a top inside space 9 and a bottom inside space 12 which are connected to outside valve ports 11, 14 by way of a radial respectively axial bore 10, 13. Beside the central bore 5 to guide the tappet 8, the insert 15 and the washer 16 each have at least one passage 17, 18 for the conveyance of working fluid medium. The tappet 8 is equipped with a thrust 19 on which a resetting spring 20 that acts in the opening direction is supported, and the other thrust of spring 20 is defined by the washer 16. The thrust 19 is defined by a boss extending circumferentially about the tappet 8.

For the stroke adjustment, it is deterimined, on the one hand, how far the tappet 8 which is preassembled in the support member 6, with the resetting spring 20 compressed and with a support on the valve seat 7, projects from the upper boundary plane of the insert 15, mounted flush with the support member 6. The upper extremity 6a of the support member 6 will remain in contact with the annular housing stop 4a at all times. On the other hand, it is determined how far the armature 3 is set back compared to the plane of reference produced in the housing due to the step in diameter, with the resetting spring 21 compressed and abutment of the armature 3 on the top housing part without anti-stick washer. The thickness of the necessary anti-stick washer 22 is then calculated from both measurements.

Reference numerals are used in the following Figures only inasfar as they are required to explain the differences over the previously described embodiments. Details which have not been modified or which are per se obvious will not be referred to for the sake of clarity. The same applies especially to the illustrated peripheral components, such as seals, end caps and filters, which are customary in magnetic valves of this type and well known to the expert in the art.

Figure 2:
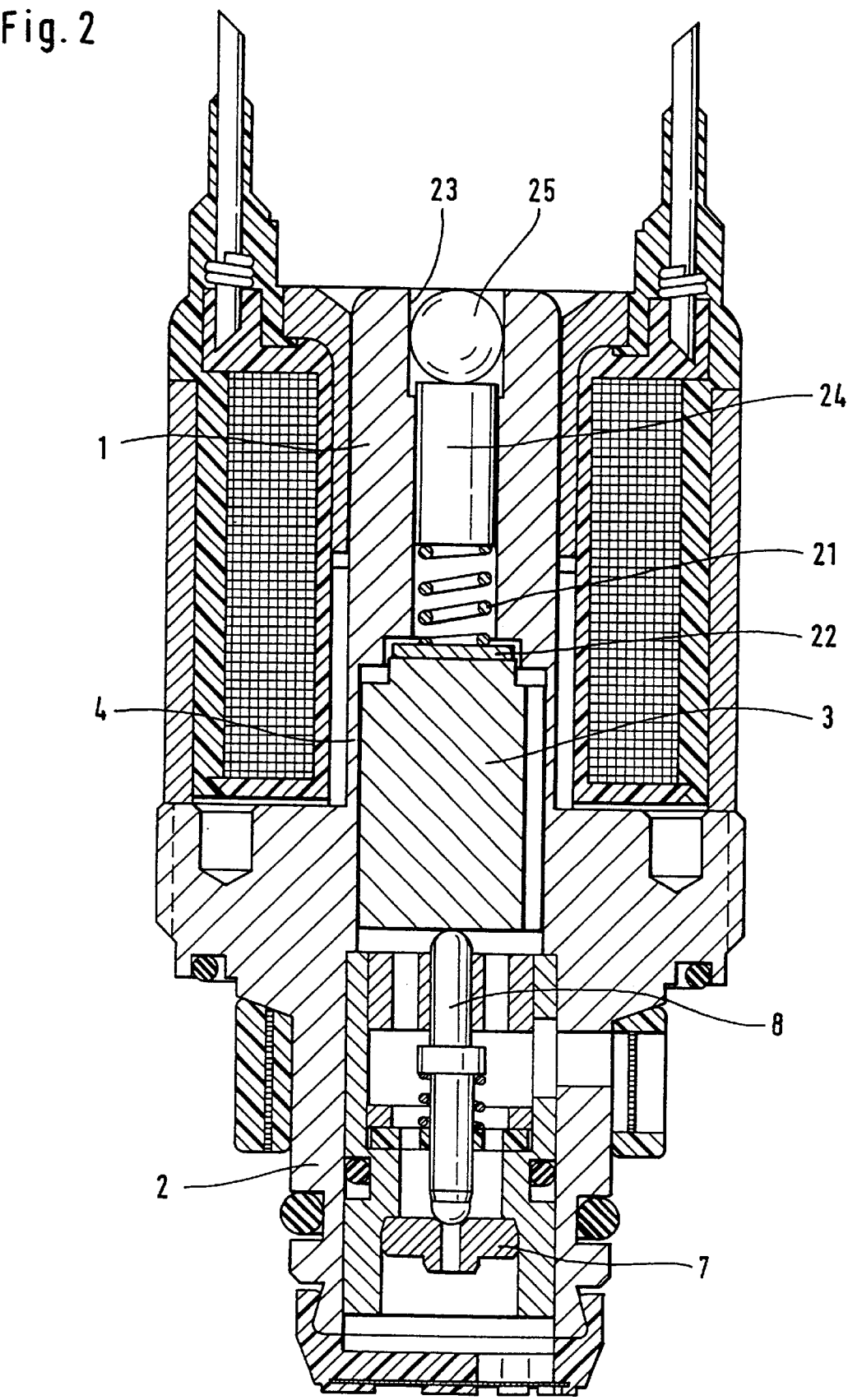
FIG. 2 is a view of a second embodiment.

In the embodiment of FIG. 2, the top housing part 1 has a central bore 23 which is expediently stepped and used to accommodate the resetting spring 21 and a cylindrical thrust 24. The bottom housing part 2 with valve seat 7 and tappet 8 is not modified compared to the FIG. 1 embodiment. The armature 3 which, with part of its length, is guided in the sleeve 4 of the housing 1, 2 is supported on the valve seat 7 by way of tappet 8 and on the resetting spring 21 by way of an anti-stick washer 22. Resetting spring 21, in turn, is supported on the ball 25 that is sealingly pressed into the bore 23 by way of the thrust 24. To adjust the desired closing pressure, the ball is pressed in downwardly, when installed into the bore 23, as far as until the bias of the resetting spring 21 on the valve seat 3 produces the desired closing pressure, and the latter pressure is applied from below through the valve seat either mechanically or hydraulically to the tappet 8. More specifically, the ball 25 is slipped in until the valve seat 7, with the application of opening pressure, is closed by the tappet 8.

Figure 3:
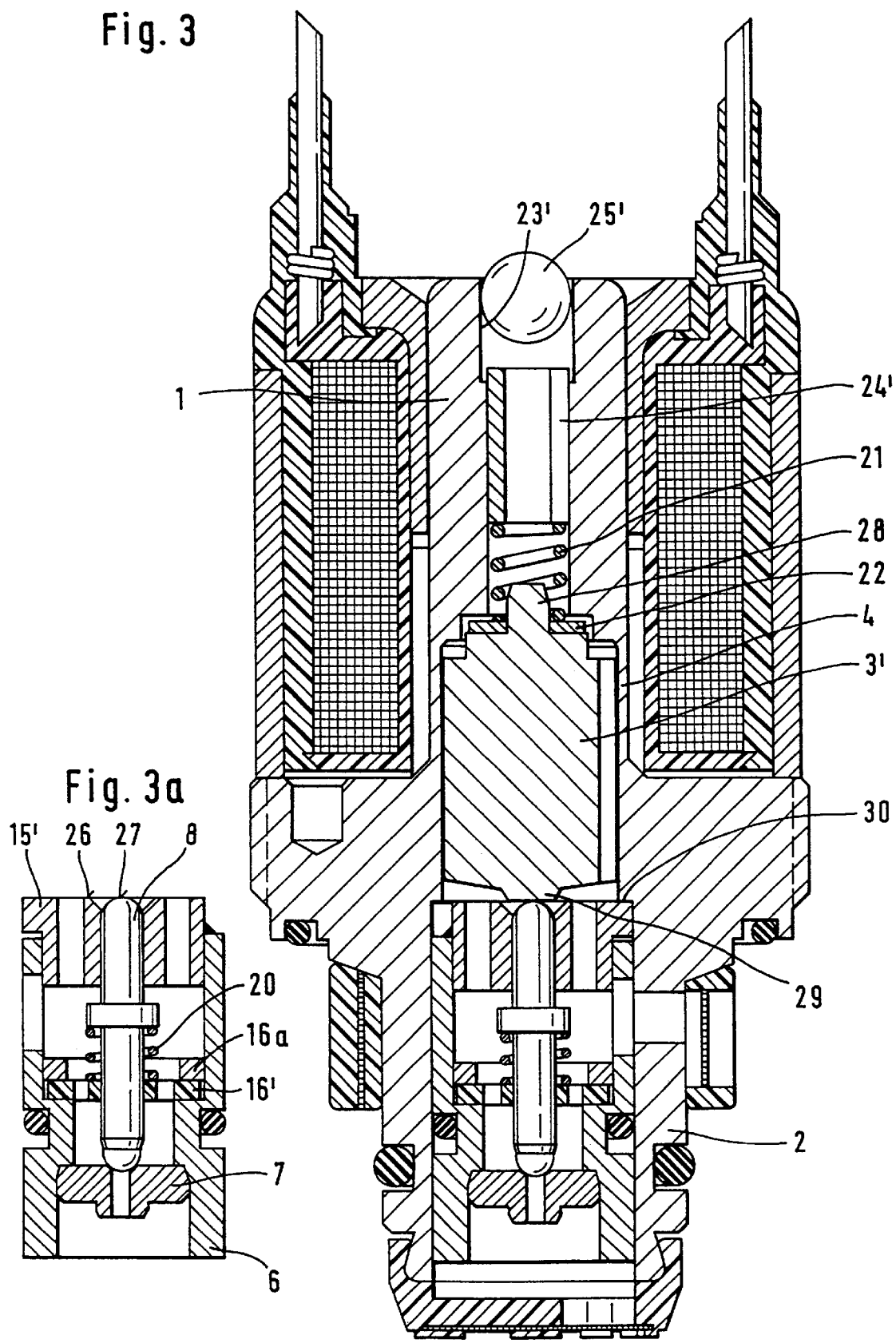
FIG. 3 is a variation of the second embodiment.

The embodiment according to FIG. 3 differs from the embodiment of FIG. 2 in that the ball 25' in the bore 23' has only a sealing function rather than an adjusting function. The hollow-cylindrical thrust 24' which is undisplaceably inserted into the housing part 1 serves as a top support for the resetting sprng 21, and the bottom support occurs by way of the anti-stick washer 22 on the armature 3' which includes a central guide pin 28. On the opposite side, the armature 3' has a plastically defonnable bead 29. The housing part 2 again has a stop 30, and both housing parts 1, 2 are integrally interconnected by way of a sleeve 4.

To explain the adjustment, the support member 6 with the components it comprises is once more illustrated in detail in the embodiment of FIG. 3a. The tappet 8 bears against the valve seat 7 and is guided by way of the insert 15' and the washer 16'. Washer 16' is retained in the support member 6 by a clamping ring 16a. In the preassembly, the insert 15' is slipped into the support member 6 until its top boundary plane 26 is flush with the stop surface 27 of the tappet 8 which abuts the valve seat 7, with the resetting spring 20 compressed. The insert 15' is fixed in this position in the support member 6. Subsequently, the armature 3' is pushed upwardly until it reaches the stop and the bead 29 is deformed plastically until its stop surface is set back by the desired operating stroke compared to the stop 30 in the second housing part 2.

Figure 4:
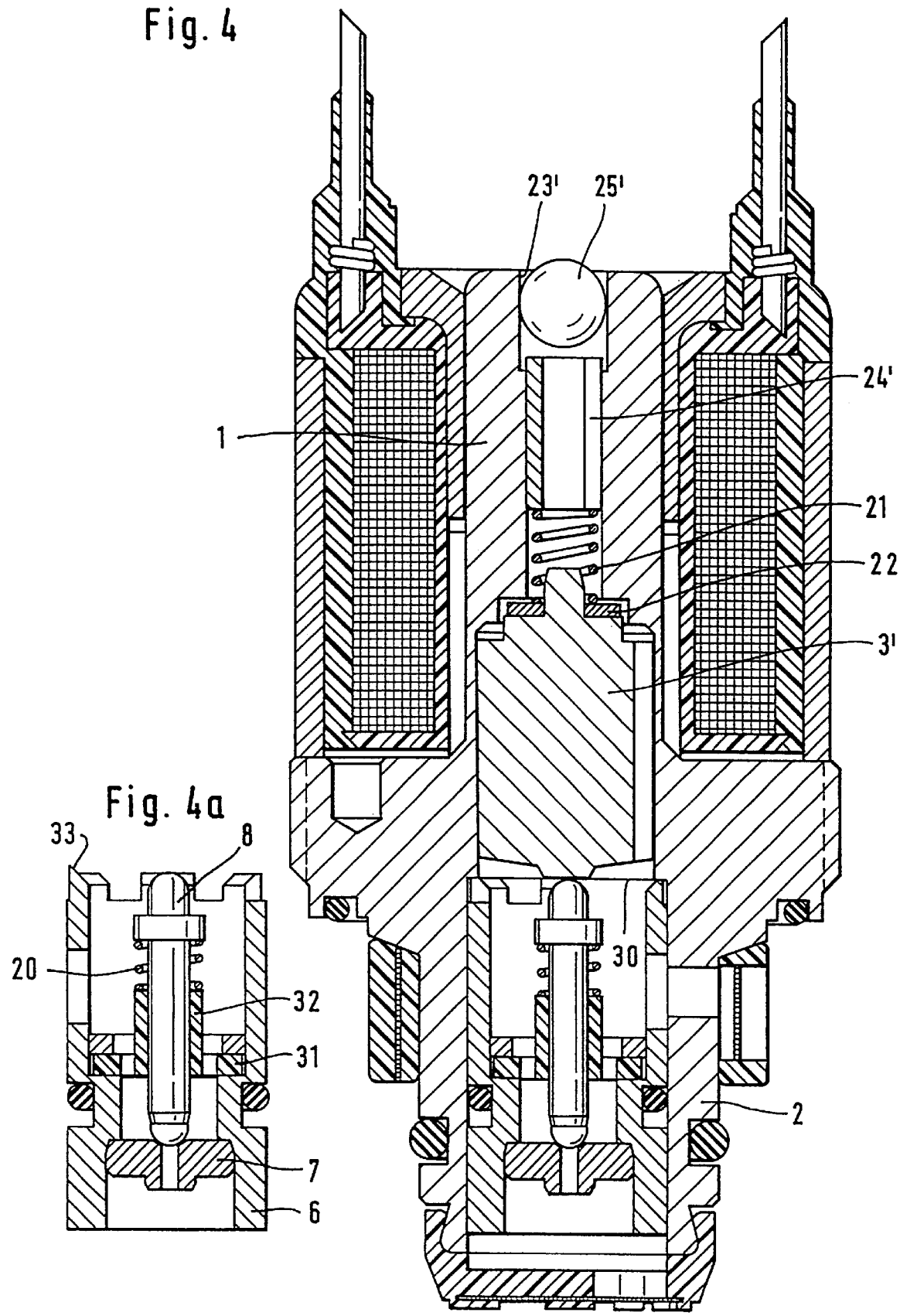
FIG. 4 is another variation of the second embodiment.

The embodiment of FIG. 4 shows a variation of the FIG. 3 embodiment. Only FIG. 4a will be explained more closely. Instead of the insert 15' and the waher 16', only a washer-type insert 31 with an extended guide portion 32 is provided to guide the tappet 8. The support member 6 is plastically deformable at its top end due to the provision of recesses in the cylindrical edge and the remaining edge portions tapering. It is ensured in the preassembly that the top area 33 of the support member 6 is urged to retreat by plastical deformation so far that its stop plane is flush with that one of the tappet 8 which then abuts on the valve seat. The further adjustment on the armature 3' is effected as in FIG. 3.

Figure 5:
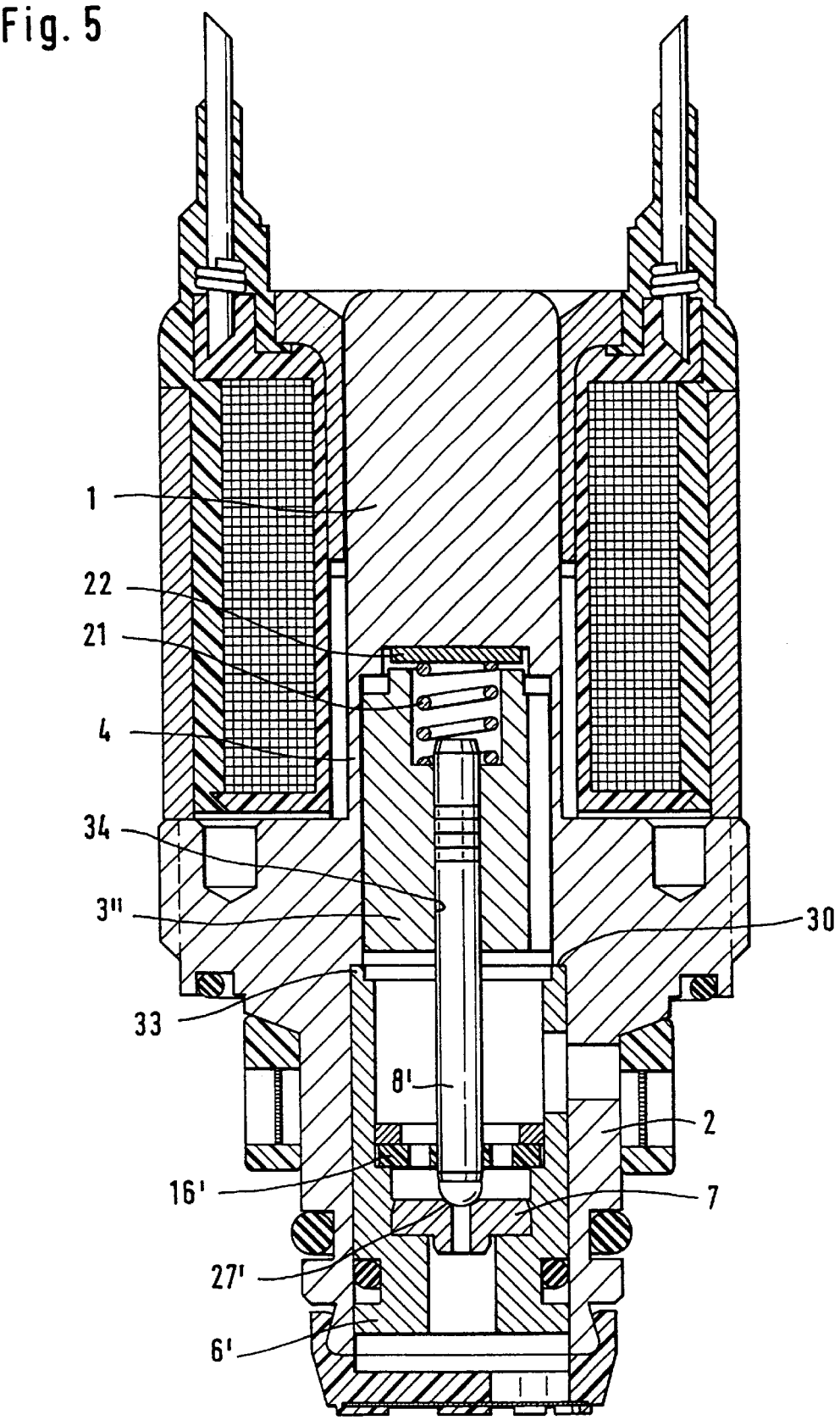
FIG. 5 is a variation of the first embodiment.

FIG. 5 shows an embodiment wherein exactly as in FIG. 1 the top housing part 1 is configured as a solid cylindrical area. In contrast to FIG. 1, however, the tappet 8' is not configured as a component part which is movable irrespective of the armature 3" but retained in the armature. This obviates the need for the second resetting spring 20 because the tappet 8' automatically follows the movements of the armature 3". The insert 15 to guide the tappet 8' was also omitted. Washer 16' is still provided which is fixed in position in the support member 6' by a caulking ring (not shown). The plastical deforinability of the top area 33 of the support member 6' was taken from the embodiment of FIG. 4.

For the adjustment, the armature 3" with the tappet 8' retained in a light press fit is inserted into the housing and pushed upwardly until the stop is reached. Subsequently, the tappet 8' is pushed upwardly relative to the armature 3" until the stop surface 27' of the tappet 8' is at a predetermined axial distance from the stop 30 in the housing part 2. Further, the deformable area 33 is compressed downwardly until its stop plane is at a defined distance from the valve seat 7. Thereafter, the support member 6 can be slipped into the bottom housing part 2 until stop 30, with the result that the desired operating stroke is adjusted.

Figure 6:
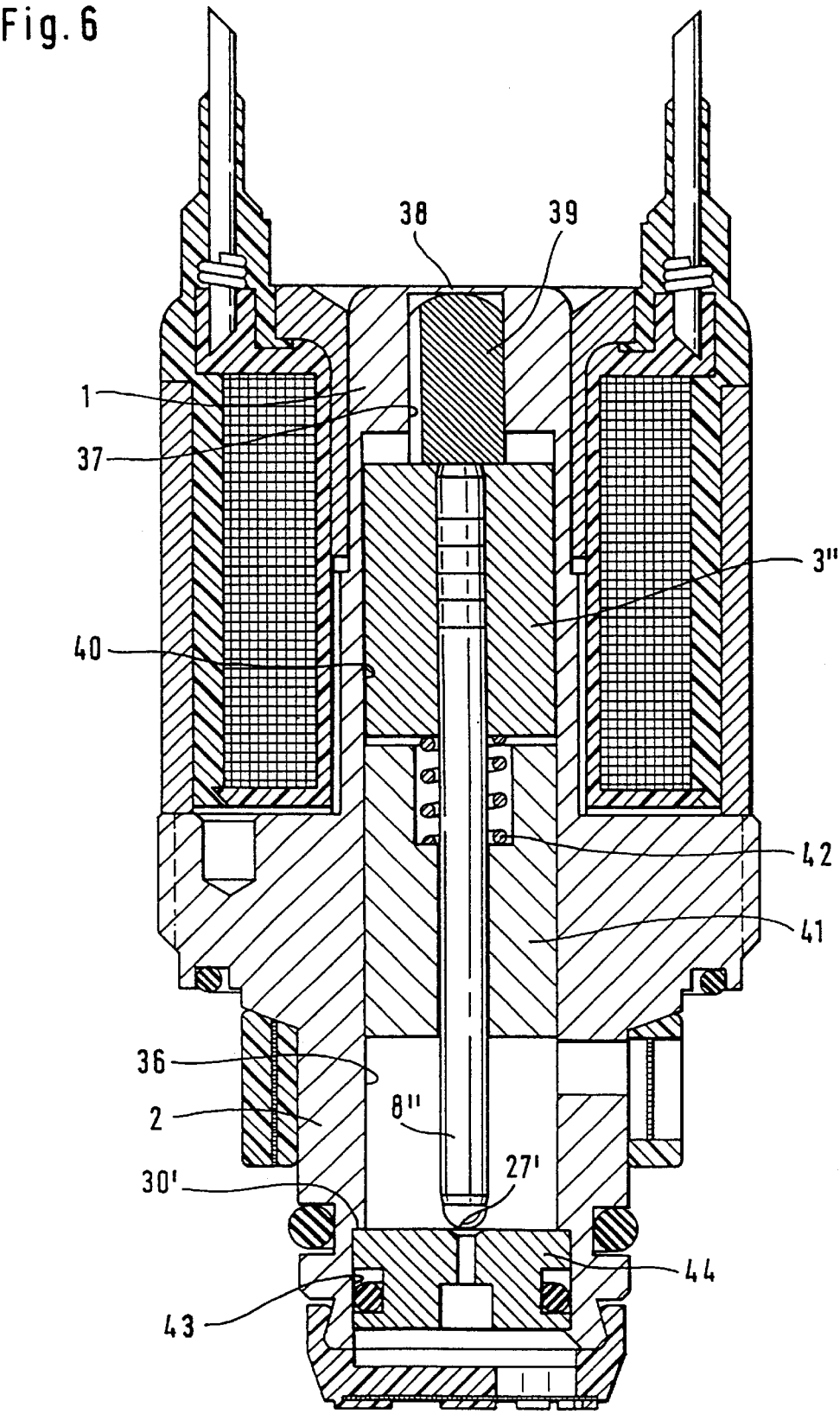
FIG. 6 is a view of a third embodiment.

In the embodiment of FIG. 6, the housing 1,2 includes a stopped bore 36 whose top portion 37 has the smallest diameter and is closed by a plastically deformable housing wall portion 38 which is designed integrally with the housing 1,2. A pin 39 is arranged in this portion 37. In the mid-portion 40, the axially slidable armature 3" with the attached tappet 8" is arranged, as well as a magnetic core 41 with a guide bore for the tappet 8". A resetting spring 42 which acts in he opening direction is compressed between the armature 3" and the magnetic core 41. A valve seat 44 is pressed into the bottom portion 43 of the stepped boe 36 which has the largest diameter.

FIG. 6 depicts a variation showing what a customary NO-valve would look like based on the above suggestions. The position of the sealing ball of the tappet 8" is dictated by the bead 30' and is adjusted by deformation of the area 38 and the related movement of the pin 39 which has previously been pressed in. Tappet 8" and armature 3" are rigidly connected.

To position the magnetic core 41, the armature 3" is pressed in so as to be roughly preposition. The press-in accommodation comprises a coil which is thn energized. This causes the air gap to close, and the tappet 8" and said's sealing ball 27' change their position with respect to the bead 30'. Continued pressing in of the magnetic core 41 causes the armature 3" with the tappet 8" to adopt the optimal position with respect to the bead 30'.

Figure 7:
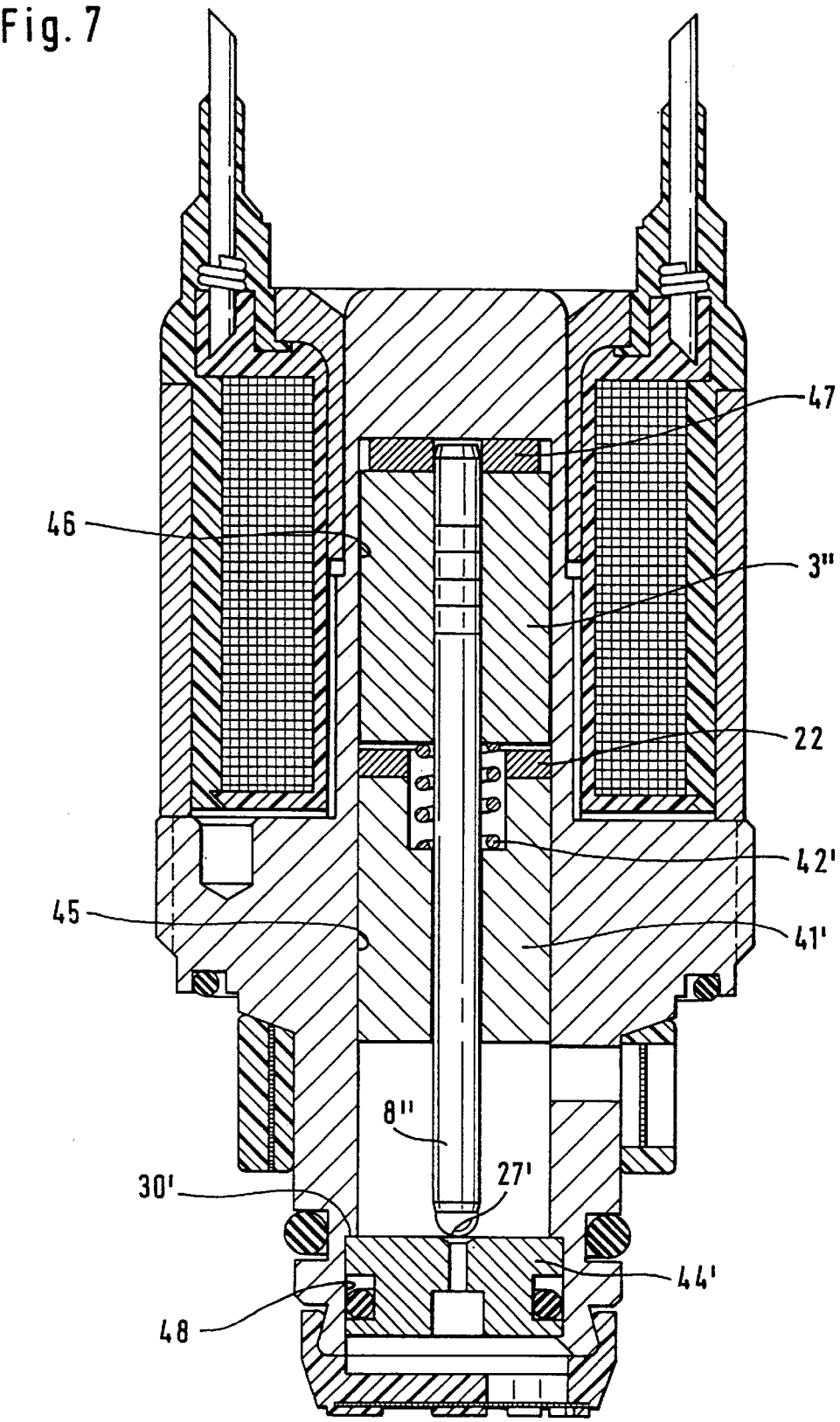
FIG. 7 is a view of a fourth embodiment.

In the embodiment of FIG. 7, the top portion of the top housing part 1 again has a solid cylindrical design. The stepped bore 46 houses the armature 3", the anti-stick washer 22, the resetting spring 42', the magnetic core 41' and the tappet 8". A valve seat 44 is pressed into the bottom part 48 of the stepped bore until the stop 30' is reached.

The tappet 8" is prepositioned in the armature 3" only in a light fit in this case. Both parts are fitted into the housing 1,2, and then the tappet 8" is displaced upwardly relative to the armature 3" until the stop surface 27' of the tappet 8" again has a predetermined axial distance from the stop 30', preferably, until it is flush with the stop 30'. Thereupon the magnetic core 41' is slipped in until its bottom edge is at the predetermined axial distance from the reference plane defined by the stop 30' or until the resetting sprin 42' has a predetermined bias which can be checked by retraction of the tappet 8". This permits adjusting the desired air gap between the armature 3" and the magnetic core 41' when the magnetic coil is not energized.

FIG. 7 depicts a variation of FIG. 6 in the positioning of the sealing ball 27' relative to the bead 30' by displacing the tappet 8" in the armature 3" which is supported on a washer 47. A further considerable increase in force can be achieved by a washer 22 which is disposed at the air gap and associated with the magnetic core 41.

The above-mentioned embodiments and possible adjustments permit adapting the one-part housing of the present invention to most various requirements. More particularly, normally open and normally closed valves can be achieved, as has been shown. The adding manufacturing tolerances may be adjusted in the assembly in all cases. The manufacture of the housing is less costly than that of multi-part housings. It necessitates reduced assembly efforts, and a magnetic valve comprising a housing of this type is very easily adjustable.

The above-mentioned adjustment possibilities may of course also be used—directly or in a modified form—in other shapes of housings, especially in housings made up of two or more parts, provided similar installation conditions prevail. Under certain circumstances, the same advantages as in the one-part housing of the present invention may be achieved.

What is claimed is:

1. A magnetic valve for controlling movements of liquid and gaseous working fluid contained therein, comprising:
    a) a unitary housing of a ferromagnetic material, said housing containing two axially extending and abutting compound interior bores, the first bore having a first diameter, the second bore having a second diameter larger than said first diameter;
    b) said unitary housing including a first cylindrical housing part that defines a first cylindrical sleeve, said first sleeve containing said first bore;
    c) a magnetic coil circumferentially disposed about said first sleeve,
    d) an axially moveable armature circumferentially supported within said sleeve, and guided therein for reciprocal movement in response to excitation via said magnetic coil,
    e) said housing further comprising a second cylindrical housing part coaxial with said first cylindrical housing part; said second housing part defining a second cylindrical sleeve containing said second bore, wherein the abutting interface of said first and second bores defines an annular stop, wherein said stop faces the interior of said second bore, and wherein said armature defines a radially disposed end-face which becomes radially aligned with said stop at one reciprocal limit of movement of said armature,
    f) a tubular valve support disposed circumferentially within said second bore and having one extremity thereof in contact with said stop;
    g) an annular tappet valve seat disposed fixedly within and at an opposite extremity of said tubular valve support from said stop,
    h) a tappet valve defined by an axially moveable one-piece, elongated pin body disposed within said valve support, said body having a first diameter, and having an annular thrust portion medially of its extremities, said thrust portion defining a boss having radially disposed surfaces, said boss being of a second and greater diameter than said first diameter of said body;
    i) an annular washer support member positioned between said thrust portion and said valve seat, said support member defining an aperture, said pin body extending through, and being radially supported by and moveable within the aperture of said washer; and
    j) a first resetting spring extending about one end of said tappet pin body, said spring being supported on and between said annular thrust portion of said pin body and said washer support member, wherein one end of said one-piece pin body is disposed within said tubular valve support for achieving direct physical contact with the end-face of said armature.

2. Magnetic valve as claimed in claim 1, wherein an inside space of the support member is subdivided by the valve seat, and one part of the inside space is connected to a first outside valve port by way of a radial bore and a second part of the inside space is connected to a second outside valve port by way of an axial bore.

3. Magnetic valve as claimed in claim 1, wherein a bore for the tappet includes an insert placed in the top of the support member and a washer spaced axially with respect thereto, the insert being fixed to the support member in an inside space above the valve seat of the support member and aligned with the axis of the tappet, wherein the insert and the washer each comprise axial passages to convey fluid operating medium.

4. Magnetic valve as claimed in claim 3, including a second resetting spring, wherein the tappet valve pin body in an area between the insert and the washer includes a thrust defined by a boss extending circumferentially about said pin body, said thrust providing a radial support surface for one end of said second resetting spring, said spring providing a force which acts in a direction to open said magnetic valve, wherein said resetting spring is supported at its other end by said washer.

5. Magnetic valve as claimed in claim 4, wherein interposed between the armature and the first housing part is said first resetting spring which acts in a direction to close the valve at a force which is in excess of said force of the second resetting spring.

6. Magnetic valve as claimed in claim 5, wherein interposed between the armature and the first housing part is an anti-stick washer having a thickness which is sized for establishing a limit of movement of the armature in response to said excitation via said magnetic coil.

7. Magnetic valve as claimed in claim 1, wherein said first cylindrical housing part further defines a top housing part at its uppermost extremity, and wherein a central axial bore is provided in said top housing part, wherein a spherical ball is sized to frictionally engage the top extremity of said central axial bore for sealing said bore against leakage therefrom of said working fluid, a cylinder defining a spacer between said first resetting spring and said ball, whereby said ball is positioned axially within said central axial bore for contacting and displacing said cylinder, which contacts said first resetting spring, which contacts said armature, which contacts said tappet, which contacts said second resetting spring, in that order, for establishing initial resetting spring adjustments of said valve.

8. Magnetic valve as claimed in claim 3 wherein said armature further comprises a central guide pin comprising a first integral boss at one end extending axially toward the first housing part, and a plastically deformable bead comprising a second integral boss at the opposite end, said second boss disposed for direct physical contact with said tappet, said guide pin comprising means for assuring concentricity of said first resetting spring, said deformable bead comprising means for establishing resetting spring adjustments of said valve.

9. Magnetic valve as claimed in claim 8 wherein the washer support member further comprises an elongated annular bushing for imparting support to that portion of the pin body of the tappet which extends between said thrust portion and said valve seat.

\* \* \* \* \*